Figure 1:
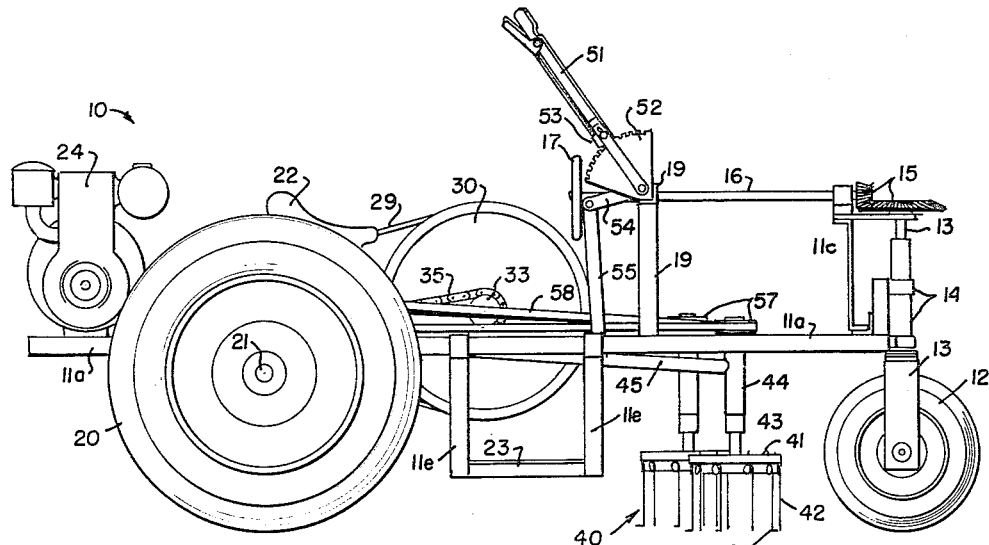
Figure 2:
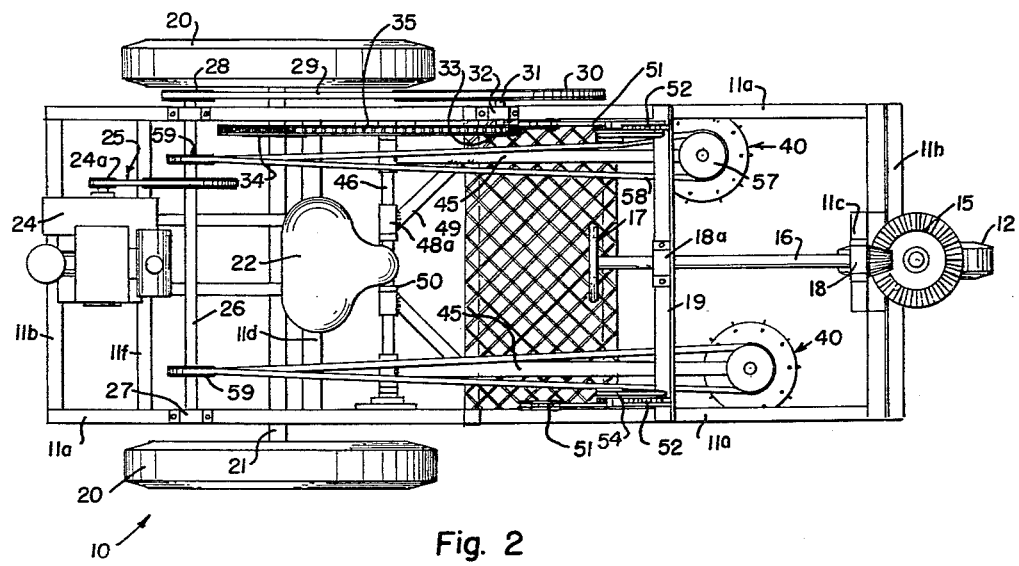

Feb. 16, 1965  H. J. THUROW  3,169,583
APPARATUS FOR BLOCKING AND THINNING OF ROW CROP FARM PRODUCE
Filed Dec. 7, 1962  2 Sheets-Sheet 1

INVENTOR.
Herbert J. Thurow
BY
ATTORNEY

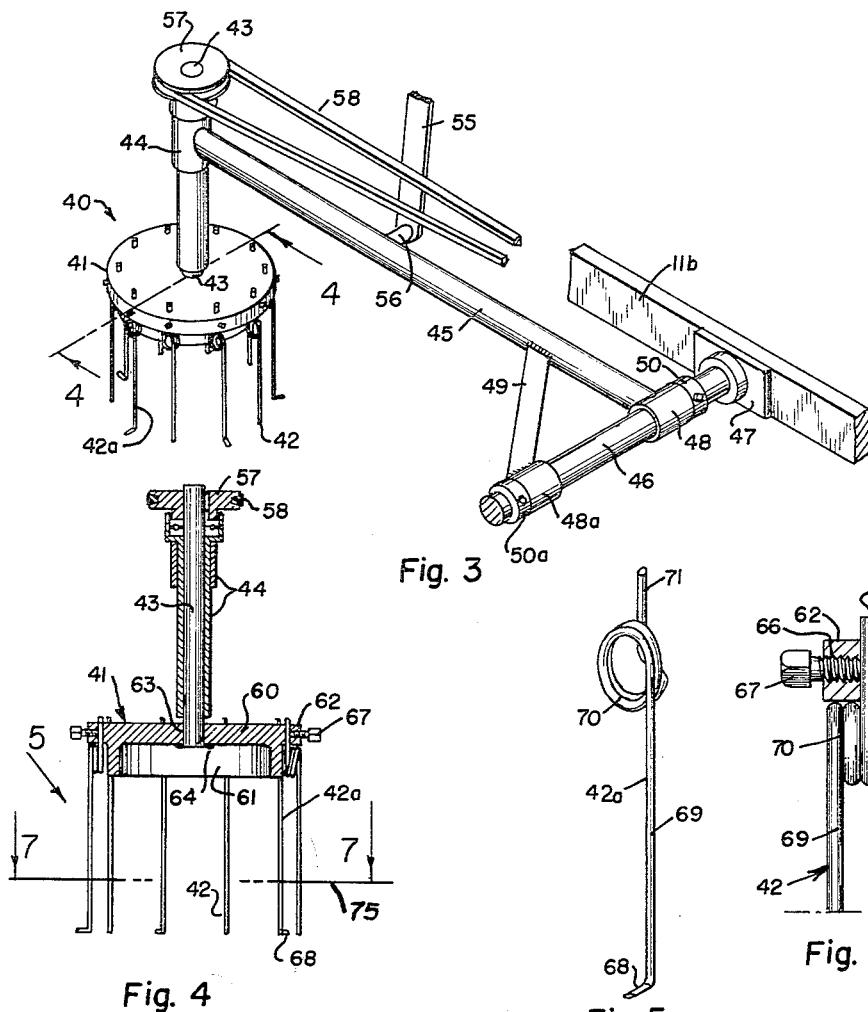
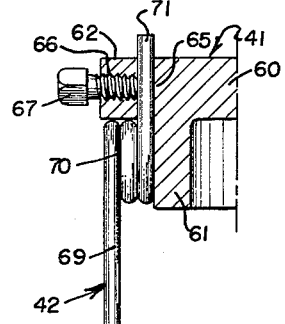
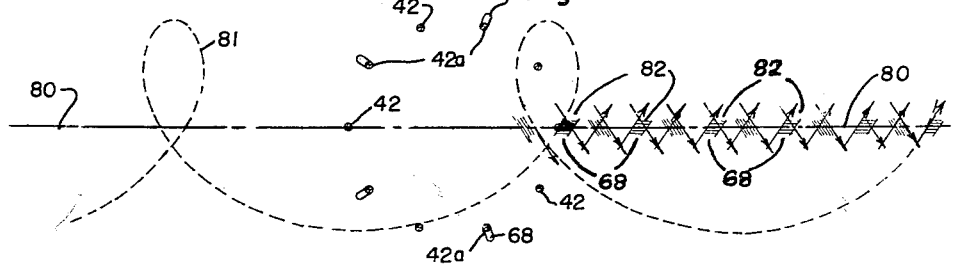
Fig. 3
Fig. 4
Fig. 5
Fig. 6
Fig. 7
INVENTOR.
Herbert J. Thurow
BY
ATTORNEY

United States Patent Office 3,169,583
Patented Feb. 16, 1965

1

3,169,583
APPARATUS FOR BLOCKING AND THINNING OF ROW CROP FARM PRODUCE
Herbert J. Thurow, R.R., Ault, Colo.
Filed Dec. 7, 1962, Ser. No. 243,120
6 Claims. (Cl. 172—111)

This invention relates to crop thinning apparatus, and more particularly to apparatus for the blocking and thinning of row-crop farm produce. The invention is especially, though not exclusively, adapted for the thinning of sugar beets and therefore the apparatus will be hereinafter referred to as a "beet thinning apparatus" or simply as a "beet thinner" and described with respect to the problems encountered in beet thinning operations. It is to be understood, however, that such is not limitative to the uses of the invention.

Such produce as sugar beets is seeded and grown in rows. The planting machines invariably plant the seeds too thickly and usually the newly growing plants are too thick for proper growth and they have to be thinned to regular spacings of one plant approximately every four to six inches along the row. This thinning or blocking is conventionally done by hand, for, although that operation is expensive, no effective and efficient thinning machines have been heretofore developed. Moreover, it would appear that too many variable conditions exist to justify machine thinning operations.

The present invention was conceived and developed with the above conditions and needs in view, and comprises, in essence, a beet thinning apparatus which is a wheel-mounted, power-driven unit having a novel and improved arrangement of thinning tines carried upon rotatable heads and with the thinning mechanisms being intergeared with the driving wheels of the unit to positively correlate the thinning action with the forward movement of the apparatus.

It follows that a primary object of the invention is to provide a novel and improved beet thinning apparatus which is capable of blocking and thinning a row of sugar beets, or any like row crop, to leave uniformly spaced growing plants in the row and at the same time cast aside the thinned-out plants and to cultivate the plants left standing.

Another object of the invention is to provide a novel and improved beet thinner which is quickly and easily adjusted to cut at various depths into the ground with relation to the ground surface and while the apparatus is moving as along a growing row of beets, to more effectively contact and remove plants having different stages and depths of growth and to more effectively adjust the apparatus for efficient operation as the soil conditions vary.

Another object of the invention is to provide a beet thinner having as its primary operative mechanism a novel and improved array of thinning tines carried upon a rotatable head, with each tine being independently spring-tensioned at its head connection to effectively cultivate, cut and sweep in and across the plant row, and also to yield and slide over fixed objects such as rocks without disrupting the normal operation of the apparatus.

Another object of the invention is to provide a novel and improved beet thinner which is capable of carrying its operator, thinning out two or more rows of beets at a time and permitting operations to proceed at a fast rate.

Another object of the invention is to provide a novel and improved beet thinner which is capable of quickly blocking and thinning out a row of sugar beets to leave plants standing at a selected spacing and thereby eliminate hand labor operations for the thinning-out operations.

2

Other objects of the invention are to provide a novel and improved beet thinner which is a low-cost, economically-maintained, easily-operated, reliable, rugged and durable unit.

With the foregoing and other objects in view, all of which more fully hereinafter appear, my invention consists of certain constructions, combinations and arrangements of parts and elements as will become apparent from the following detailed description, the appended claims and the preferred embodiment of a machine as illustrated in the accompanying drawings in which:

FIGURE 1 is a side elevational view of one arrangement of my improved beet thinning apparatus having two rotatable tine-carrying heads mounted thereon and combined therewith to thin two rows of beets with each pass of the machine.

FIGURE 2 is a plan view thereof.

FIGURE 3 is an enlarged, isometric view of a fragment of the frame of the machine and of a tine-carrying head and its supporting framework, comprising a thinner head assembly, which is connected to the frame of the machine.

FIGURE 4 is a sectional elevational view as taken from the indicated line 4—4 at FIG. 3 but on an enlarged scale.

FIGURE 5 is a perspective view of a tine per se, as taken from the indicated arrow 5 at FIG. 4 but on an enlarged scale.

FIGURE 6 is a fragmentary sectional detail illustrating a portion of the showing at FIG. 4 but on a greatly enlarged scale.

FIGURE 7 is a sectional plan view of the tine ends mounted upon a rotatable head, as taken from the indicated line 7—7 at FIG. 4, illustrating these tines as being mounted over and to move in and along a beet plant row, illustrated as a dashed line, and illustrating further, in broken lines, the path of movement of a single tine as the apparatus moves along the beet plant row and rotates at the same time and, also, one type of a criss-cross pattern that may be obtained as the tines cross back and forth on the row as the apparatus moves forwardly.

Referring more particularly to the drawings, and to FIGS. 1 and 2 thereof, it is contemplated that my improved thinning apparatus will include a power-driven tractor of any suitable type which may be modified to hold one or more thinning heads and to rotate these heads in conjunction with the forward movement of the tractor. The embodiment illustrated in the drawing is a comparatively-small three-wheel tractor or cart 10 which carries a pair of thinning heads for thinning two rows of beets at a time. This arrangement is especially useful for one-man operation on a small or moderate sized beet farm, and it is to be understood that the use of a tractor unit such as cart 10 is illustrative and not restrictive of the several arrangements possible within the scope of the invention.

This cart 10 is formed as a wheel-mounted unit having a rectangular frame 11. This rectangular frame includes a pair of spaced longitudinal side members **11*a*, interconnecting transverse end members 11*b*** and other members for holding the various components as hereinafter described.

The front of this frame is carried by a turn wheel 12 which is mounted between the forks of an upstanding yoke 13. The yoke, in turn, is carried in suitable bearings 14 which are affixed to frame members including members **11*c*. Gears 15 connect this yoke to rearwardly extended steering shaft 16** which terminates as a steering wheel 17 at its rearward end near the center portion of the frame. This steering shaft 16 is held in position by a bearing 18 on the frame member 11c and a bearing 18a on a structural bridge 19 near the center of the frame; the bridge is in the form of an inverted U with the leg portions thereof unstanding from the longitudinal frame members 11a.

The rear of this frame is carried by a pair of rear wheels 20 which are connected to a transverse shaft 21 to extend laterally from the sides of the frame members 11a. The shaft, in turn, is mounted in bearings connected to the underside of the frame members 11a at positions not shown. The shaft is rotated for driving the rear wheels and the cart by mechanisms hereinafter described.

This cart 10 is proportioned to provide a driver's section, at the rear-center portion including a seat 22 between the drive wheels, which is supported upon a suitable transverse frame member 11d adjacent to the wheel shaft 21. A foot-rest platform 23 is located forwardly of the seat and below the steering wheel and frame members as upon depending struts 11e. This positioning of the seat and platform rearwardly of the steering wheel leaves a substantial clear space between the frame members, forwardly of the steering wheel and the bridge 19, where the pair of thinning mechanisms are positioned as hereinafter described.

This cart 10 is powered by a motor 24 which is connected to the rear end of the cart as upon the transverse frame member 11b and other members 11f. The output shaft 24a is connected by a pulley-belt group 25 to a power distribution shaft 26 which extends transversely across the frame 11 adjacent to the motor and with shaft 26 being mounted in bearings 27 on the longitudinal frame members 11a. Suitable controls, not shown, are extended from the motor to a convenient position alongside the driver's seat which control the speed of the motor. Also, in types of motors which do not have an automatic clutch associated with the output shaft 24a, a suitable friction clutch is associated with one of the pulleys of the group 25, of any conventional type, which is either actuated automatically by increase of speed of the motor or manually by controls extending to a convenient position alongside the driver's seat. Such controls are not shown, being conventional well-known arrangements.

The power distribution shaft 26 is operatively connected to the rotating thinning heads, as hereinafter described, and also to the rear drive wheel shaft 21 for driving the cart in conjunction with the rotation of the thinner heads. This connection to the shaft 21 is by a pulley-belt, sprocket-chain arrangement which is conveniently mounted alongside a frame member 11a. A pulley 28 is positioned at the end of the shaft 26 and is connected by a belt 29 to a large diameter speed reducer pulley 30. This pulley 30 is mounted upon a stub shaft 31, which, in turn, is carried in a bearing 32 affixed to the member 11a. The stub shaft 31 also carries a sprocket 33 which is interconnected by a chain 35 to a sprocket 34 on the drive wheel shaft 21 to complete the train of drives.

Each thinner unit 40 includes a disc-like head 41 having a circular array of tines 42, extending about the periphery and to one side thereof in a cylindrical pattern, and an axially-centered drive shaft 43 extending from the other side of the head. In use, the head 41 is held in a horizontal plane above the ground with the tines depending therefrom into the ground, and with the shaft upstanding therefrom for connection with the supporting members of the thinner unit. Accordingly, the thinner unit 40 is expediently described with reference to its said positioning when the head is held in its proper operative position.

The shaft 43, of the thinner head, is carried and held in a vertical bearing post 44 which is affixed to the end of a longitudinally disposed rocker arm 45. The rocker arm, in turn, extends rearwardly from its bearing post end to lie alongside the adjacent frame member 11a and with its rearward end being engaged to a transverse holding shaft 46 which is carried between the longitudinal frame members in brackets 47. It is to be noted that the width of the cart 10 and the spacing apart of the two rocker arms 45 is established by the regular spacing of beet rows, with the frame being sufficiently wider than the beet row spacing, so as to permit each rocker arm 45 and the thinner head upon it to be disposed directly over a beet row when in operation, and yet clear the adjacent longitudinal frame member 11a.

Each rocker arm is pivotally carried upon the holding shaft 46, so that the arm may be rocked upon the shaft for vertical adjustment of the thinning head, and in order to obtain sufficient vertical adjustable movement of the head without excessive tipping from a normal horizontal position the rocker arm is as long as practicable. Thus, the bearing post 44 end of the rocker arm is at the forward section of the cart 10 and the holding shaft 46 is at the rearward section of the cart and at a convenient position underneath the seat 22. It follows that the rocker arms must be stabilized against lateral movements especially because of their length. This is accomplished by using a reinforced pivotal connection at the end of each rocker arm 34 and to the holding shaft 46.

A simple and rugged pivotal connection suitable for this purpose is illustrated at FIG. 3. A tubular collar 48 is welded to the end of the arm 45 to serve as the pivotal connector to the shaft 46. An inclined bracket 49 is welded to the side of the arm 45 and the end of this bracket carries a second collar 48a, welded thereto, which also serves as a pivotal connector for the shaft 46. These collars 48 and 48a are restrained from lateral movement along the shaft 46 by adjustable lock-collars 50 and 50a at each side of the pivotal connection formed by collars 48 and 48a.

Each rocker arm 45 extends underneath the bridge frame 19 alongside a frame member 11b, and the bridge 19 is ideally suited to hold a supporting and adjusting means for positioning the rocker arms. Such a preferred means includes, at each side of the bridge, a hand lever 51 pivotally mounted upon an arcuate rack 52 and with a lock detent 53 for engaging the rack. A lever crank 54 is interconnected with the hand lever 51 with its outstanding end pivotally engaging a link 55. This link extends downwardly to the rocker arm 45 for pivotal engagement with a stub 56 outstanding from the side of the arm. With each hand lever 51 being conveniently positioned ahead of the driver's section and alongside the steering wheel 17, it follows that the operator can easily reach the hand levers and make the necessary vertical adjustments of the thinner head assemblies to vary the depth at which the tines 42 cut into the earth during the thinning operations.

Each thinner head unit 40 is adapted to rotate with forward movement of the cart 10 and is operatively interconnected with the power distribution shaft 26 to rotate in conjunction with the forward movement of the cart. The shaft 43 upstanding from each head extends through its supporting bearing post 44 to carry a pulley 57 at the top of the post. This pulley is connected as by a rearwardly extending belt 58 to a drive pulley 59 on the power distribution shaft 26; a drive pulley 59 is mounted at each side of the power distribution shaft 26 substantially in alignment with the longitudinal, rearwardly extending, rocker arm 45 at that side of the cart.

Each thinning head 41 is formed as a shallow, inverted cup with a flat, disc-shaped base 60, a short, depending wall 61 and a short extension of the base as a peripheral flange 62. The flange and outer face of the rim thereby form a rabbeted peripheral shoulder, about the head, wherein the tines 42 are positioned as hereinafter described. The shaft 43 extends through a suitable central orifice 63 in the base 60 and is affixed to the base as by welding, as at 64. An array of vertical holes 65 is drilled in the flange 62 at the edge of the wall 61, each designed to receive and hold the upper end of a tine. A tapped, radially-disposed hole 66 extends from the flange 62 periphery and to each hole 65 to receive a set screw 67, which is adapted to bear against the upper end of a tine 41 which is placed in the vertical hole 65, as in the manner clearly illustrated at FIG. 6.

In the embodiment illustrated, I provide an even number of tine-holding holes 65 in the head 41, for the alternate positioning of different types of tines in the holes, and a preferred number of tines to be carried by the head is ten, as illustrated. Two types of tines 42 are used, with one type 42a differing from the other by the inclusion of a sharpened projecting foot 63 at its base. The tines are otherwise identically formed. Only tines 42a are cutter or thinner tines, while tines 42 simply weed and cultivate but do not cut out the plants as they cross a row, as will be explained.

Each tine consists of heavy gauge spring or pianolike wire of substantial strength and resilience and is formed to include a major straight portion 69, a pair of convolutions or tight spring loops 70 at its upper end of the straight portion and a connective stub 71 upstanding from the loops 70. This stub 71 is adapted to be extended into a vertical hole 65 in the head 40 for attachment thereto, as with the set screw 67 heretofore described. When so positioned on the head the spring loops 70 lie in the rabbeted shoulder of the thinner head 41 with the top edge of the loops abutting against the under surface of the flange 62 thereof and the face of the loops abutting against the outer face of the wall 61 thereof, as illustrated at FIG. 6.

The advantages of this construction become apparent when operation of the unit is considered. I usually run the machine along the rows about five miles an hour. Various twisting, pulling and racking forces are exerted on the tines during operation as the heads rotate and the tines sweep and are moved forwardly in the ground at the same time. This twisting action is especially severe on the tines having the projecting cutting feet 68. Also the tines often strike rocks and hard earth crusts and they must be deflected past such obstructions without being permanently distorted or without unduly shaking the machine. Permanent distortion of the tines is prevented since the primary deflection of the tines will occur at the spring loops 70 without the danger of exceeding the elastic limits of the spring material of the tines. My spring tensioned tines 42 and 42a vibrate and stay clean when used in wet ground, whereas a rigid tine member will not stay clean during use in wet soil. Also, the mounting of the spring loops 70 under the flange and in the rabbeted shoulder of head 41, as described, prevents the vibrating and twisting actions from shifting or displacing the tine in its mounting holes 65, since no set screw can restrain a tine against the continuous twisting and deflecting movements which is encountered in operation of the unit. With the machine constructed substantially in proportion as illustrated, upon machine forward movement my cutter heads 41 rotate about one turn to every foot of forward movement of the machine.

Operation of the thinning unit combines the forward movement of the cart 10 with rotation of the thinning heads, the heads being intergeared to the drive wheels of the cart as hereinbefore explained. It is immediately aparent that any selected ratio of driving, to establish a selected number of revolutions of a head, or fraction of a revolution, per foot of forward travel, can be established by selection of the sizes of the various pulleys 28, 30, 57 and 59.

FIGURE 7 diagrammatically illustrates the movement action of the tines in the ground as the apparatus moves forwardly with the head and its tine rotating. The row of beets to be thinned is represented as a continuous straight line 80, and it is understood that the center axis of a thinning head 40, holding the tines 42 and 42a as illustrated, will be directly above and move along a path also represented by the line 80. The path of movement of a single thinner tine 42a with its foot 68 is represented by the cycloidal broken-line curve 81 and it is to be noted that this curve crosses the straight line 80 in back and forth movements, and also that the cutter foot 68, of each thinner tine 42a, crosses the line at opposite sides of the path as indicated by shaded areas 82. When the action of all ten tines is combined, their movements will constitute a complex sweeping, cutting and cultivating action along the beet path. It is to be remembered, as explained, that tines 42a are the only cutter tines and the tines 42 act only as cultivator tines. It is to be noted that this combined action may be varied by changing the forward-movement-rotation relationship of the cutter head 40 and that the pattern illustrated at FIG. 7 is merely representative of the combined action, of the tines. The various tines will move back and forth in the ground across the line of the beet row, as along paths of the indicated arrows with double shaded areas 82 representing the paths of the cutting feet 68. It is to be noted that there are single shaded portions along the line or path 80 between cut areas 82 and where the non-cutter tines 42 pass across the row in the ground, and where the beets would be permitted to remain in place as cultivator tine rods 42 do not cut out the growing plants between areas 82.

As hereinbefore noted, the unit described uses two cutter head assemblies 40, however, wider machines may use as many as desired. Each thinner unit, however, is individually elevationally carried on the apparatus to facilitate individual adjustments during operation. During operation I usually have the lower ends of the tines from about one-half inch to one and one-quarter inches deep in the ground, with the ground surface indicated as 75 of FIGURE 4. For example, when an operator sees a group of large plants ahead of the thinner cart, as it is moving along the rows, he will move the proper hand lever 51 to lower the ends of the tines into the ground a little deeper to more effectively cut out the larger plants. Likewise, he will raise the tines slightly as he encounters smaller plants.

Having thus described and explained the operation of one preferred embodiment of my invention in considerable detail, I wish and it is to be understood that my protection is to be limited only by the proper scope of the hereunto appended claims.

What I claim and desire to secure by Letters Patent is:

1. Apparatus for thinning and blocking a row of seeded plants comprising:
   (a) a power driven frame having a power distribution shaft journalled thereto, and a drive wheel operatively connected to said power distribution shaft;
   (b) a rotatable thinner head supported on said frame in depending relation thereto, said thinner head comprising a vertically disposed driving axle, a tine supporting member secured to said axle at the lower end thereof, said driving axle being operatively connected to said power distribution shaft, said tine supporting member comprising a disc means, said disc means having a rabbeted shoulder wall disposed about the periphery thereof, a circular array of apertures located about said wall;
   (c) a plurality of resilient spring like tines, each of said tines having an upper end passing through a respective one of said apertures and a spring loop adjacent the upper end thereof adapted to be lodged in said rabbeted shoulder wall to resist twisting forces thereon, at least one of said tines being provided with an outstanding cutter blade at the lower end thereof; said tines being adapted to selectively contact the ground a given distance below the surface thereof; and (d) said frame being driven by said power distribution shaft in overlying disposition to said seeded plants, and said thinner head being simultaneously rotated a given number of revolutions with respect to each revolution of said drive wheel whereby said tines travel through a plurality of cyclic pattern traversing said row of plants at predetermined points therealong.

2. The apparatus defined in claim 1 further including means for selectively adjusting the vertical placement of said thinner head and thereby change said given distance.

3. The apparatus defined in claim 1 wherein alternate tines about said tine supporting member are provided with said cutter blades.

4. A thinner head for use with a thinning apparatus to be moved along a plant row, said thinner head adapted to simultaneously rotate at a rate correlated with the linear movement of the thinning apparatus, said thinner head comprising:

(a) a vertically disposed power shaft, a disc secured to the lower end of said shaft, said disc having a rabbeted shoulder about the periphery thereof, a peripheral flange extending completely about said shoulder, said flange having an array of apertures therein adjacent said shoulder; and, (b) a plurality of resilient spring like tines having the upper ends thereof disposed in respective ones of said apertures, each of said tines having a spring loop adjacent the upper end thereof for engaging said rabbeted shoulder and preventing rotation of said tines within said apertures.

5. The thinning head defined in claim 4 wherein at least one of said tines is provided with an outstanding cutter blade at the bottom end thereof.

6. The thinning head defined in claim 5 wherein alternate ones of said tines are provided with outstanding cutter blades at the bottom ends thereof.

References Cited in the file of this patent

UNITED STATES PATENTS

| | | |
|---|---|---|
| 274,311 | Gillett | Mar. 20, 1883 |
| 1,115,537 | Hitzemann | Nov. 3, 1914 |
| 1,506,042 | Bauer | Aug. 24, 1924 |
| 2,103,306 | Urschel | Dec. 28, 1937 |
| 2,610,559 | Peel | Sept. 16, 1952 |
| 2,748,679 | Rogers | June 5, 1956 |
| 3,010,526 | Van der Lely et al. | Nov. 28, 1961 |
| 3,059,704 | Kasatkin | Oct. 23, 1962 |
| 3,082,829 | Buddingh et al. | Mar. 26, 1963 |

FOREIGN PATENTS

| | | |
|---|---|---|
| 152,364 | Australia | July 16, 1953 |
| 967,149 | France | Mar. 22, 1950 |